Inventor
THOMAS G. MOORE
By Herman L. Gordon
ATTORNEY

Patented May 25, 1954

2,679,411

UNITED STATES PATENT OFFICE 2,679,411

HIGH-PRESSURE TUBING COUPLING

Thomas G. Moore, Takoma Park, Md., assignor to American Instrument Company, Inc., Silver Spring, Md.

Application January 10, 1949, Serial No. 70,001

1 Claim. (Cl. 285—167)

This invention relates to couplings, and more particularly to a safety coupling for connecting tubing to valves, pressure vessels, and various high pressure devices.

A main object of the invention is to provide a novel and improved coupling for connecting high pressure tubing to valves, pressure vessels, and the like, said coupling eliminating the hazards of explosion of the fastening elements of the coupling by providing an escape path for leakage fluid, whereby said leakage fluid is not allowed to build up an excessive pressure inside the coupling.

A further object of the invention is to provide an improved safety coupling for making joints between tubing and high pressure valves or pressure vessels, said coupling being simple in construction and being protected against disruption by the building up of excessive internal fluid pressure therein due to leakage, whereby hazards to personnel in the vicinity of the coupling are substantially reduced and whereby failures of the coupling are avoided.

Further objects and advantages of the invention will become apparent from the following description and claim, and from the accompanying drawings, wherein:

Figures 1, 2, 3, 4:
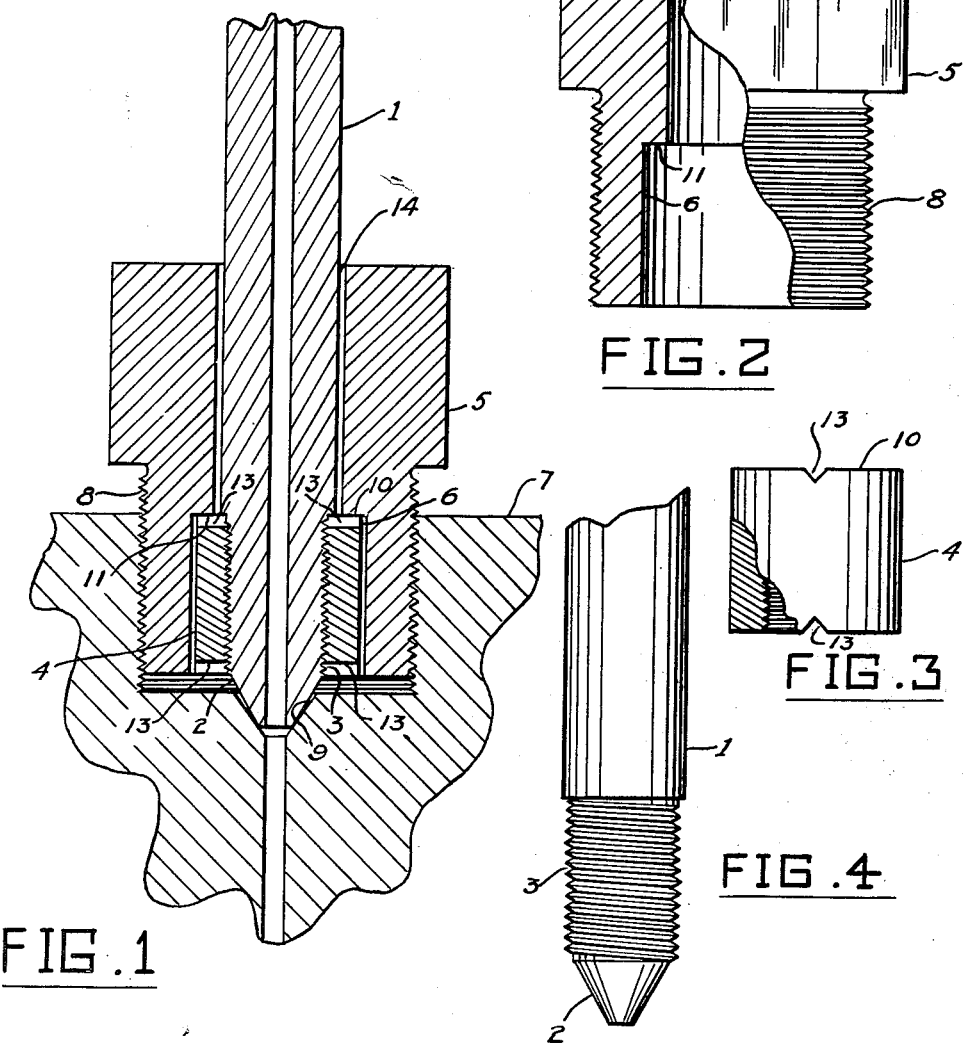
Figure 1 is a vertical cross-sectional view taken axially through an assembled high pressure coupling constructed in accordance with the present invention.
Figure 2 is an elevational detail view, partly in cross-section, of a fastening nut employed in the high pressure coupling of Figure 1.
Figure 3 is an elevational detail view, partly in cross-section, of a sleeve member employed in the high pressure coupling of Figure 1.
Figure 4 is a fragmentary detail elevational view of the end of the high pressure tubing shown in the assembly of Figure 1.

High pressure tubing is connected to valves, fittings, pressure vessels, and the like, by means of union type couplings, as illustrated in Figure 1.

According to the prior art, the tubing 1 is prepared with a conical end 2 and a left hand screw thread 3. A sleeve 4 having similar left hand screw threads is screwed onto the tube, as shown. A nut 5 formed with a recess 6 to accommodate the sleeve 4 is screwed into the body 7 of the valve, fitting, pressure vessel, or the like, by means of right hand screw threads 8.

The nut 5 bears on the sleeve 4 to force the cone end 2 of the tube 1 into contact with a female cone 9 formed in the body 7.

The sealing force between male cone 2 and female cone 9 is so great that the joint can be made pressure tight at pressures up to 100,000 pounds per square inch.

It so happens that the joint between cone 2 and cone 9 will sometimes leak, due to dirt between the engaging surfaces or imperfections in the seats. The operator usually attempts to stop the leak by exerting greater torque on the nut 5. This excess torque causes slight deformation of the screw threads and renders them pressure tight. Also, surface 10 of sleeve 4 and surface 11 of nut 5 are wrung together with such intimate contact as to create a pressure tight joint.

If the leak persists, fluid under pressure will continue to leak from the joint between cone 2 and cone 9 and fill space 6. As the fluid cannot escape through screw threads 8 or from the joint between surfaces 10 and 11, pressure builds up in space 6 until nut 5 bursts, in the manner of a pressure vessel subjected to excess pressure.

When nut 5 bursts, the joint may fly apart with explosive violence, so that the operator may be injured by pieces of metal or by fluid under high pressure.

Nut 5 is likely to fail in this manner when operating pressures in excess of 50,000 pounds per square inch are encountered.

In accordance with the present invention I employ a sleeve 4 which is so formed and arranged that pressure cannot build up inside of nut 5. Referring to Figures 1 and 3, it will be seen that notches 13 are formed in the top edge 10 of sleeve 4, these notches providing an escape path for fluid which leaks into space 6. The fluid which escapes enters space 14 and flows out into the atmosphere without bursting the nut 5.

Similar notches 13 are preferably also formed in the bottom edge of sleeve 4, as shown, so that the sleeve may be employed in inverted position.

By providing an escape path for fluid, as described above, I have been able to employ the nut and sleeve type of coupling above mentioned for pressures up to 100,000 pounds per square inch.

While a specific embodiment of an improved high pressure coupling has been disclosed in the foregoing description, it will be understood that various modifications within the spirit of the invention may occur to those skilled in the art. Therefore it is intended that no limitations be placed on the invention except as defined by the scope of the appended claim.

What is claimed is:

In a coupling of the character described, a tubular male member provided at its end with a sealing element, a collar element carried by said male member adjacent its end, and a nut element loosely surrounding said male member and defining clearance therewith, said nut element being formed with a bottom recess loosely receiving said collar element, the bottom recess of the nut element having a downwardly facing surface extending substantially from said male member normal thereto and arranged to engage the top surface of said collar element in face-to-face abutment therewith, whereby downward sealing force can be evenly exerted by the nut element on the male member, one of said surfaces being formed with a groove extending substantially from the internal side wall of the recess to the male member and defining a clearance channel for the escape of fluid from said recess inwardly to the male member and upwardly past the outer surface of the male member and out of the nut element.

References Cited in the file of this patent

UNITED STATES PATENTS

| Number | Name | Date |
|---|---|---|
| 1,441,138 | Westervelt | Jan. 2, 1923 |
| 1,664,125 | Lowrey | Mar. 27, 1928 |
| 1,799,762 | Rathbun | Apr. 7, 1931 |
| 1,919,654 | Hoffmann | July 25, 1933 |
| 2,172,650 | Couty | Sept. 12, 1939 |
| 2,226,826 | Miller | Dec. 31, 1940 |